Aug. 18, 1970    R. J. CRAMER ET AL    3,524,673
BED FOR TRUCK CABS
Filed April 8, 1968    2 Sheets-Sheet 1
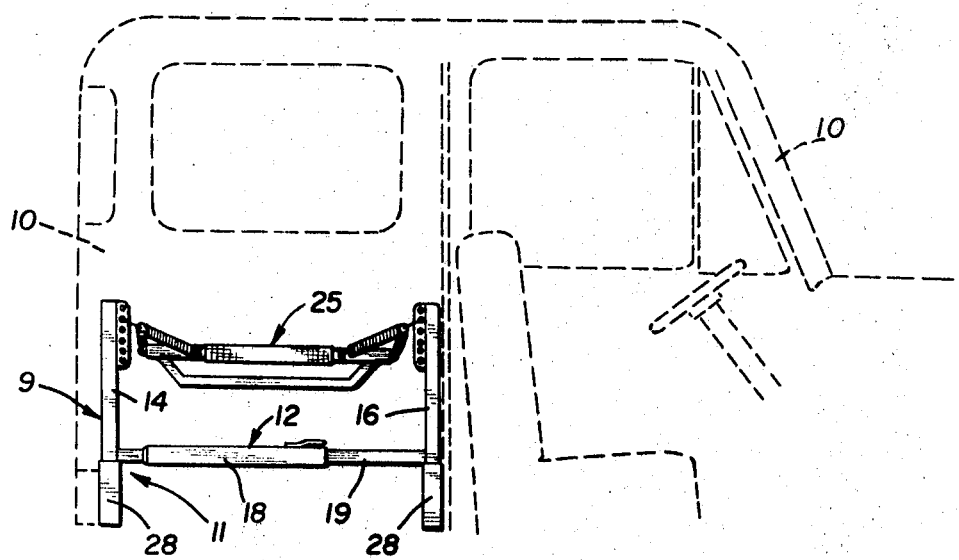
Fig_1
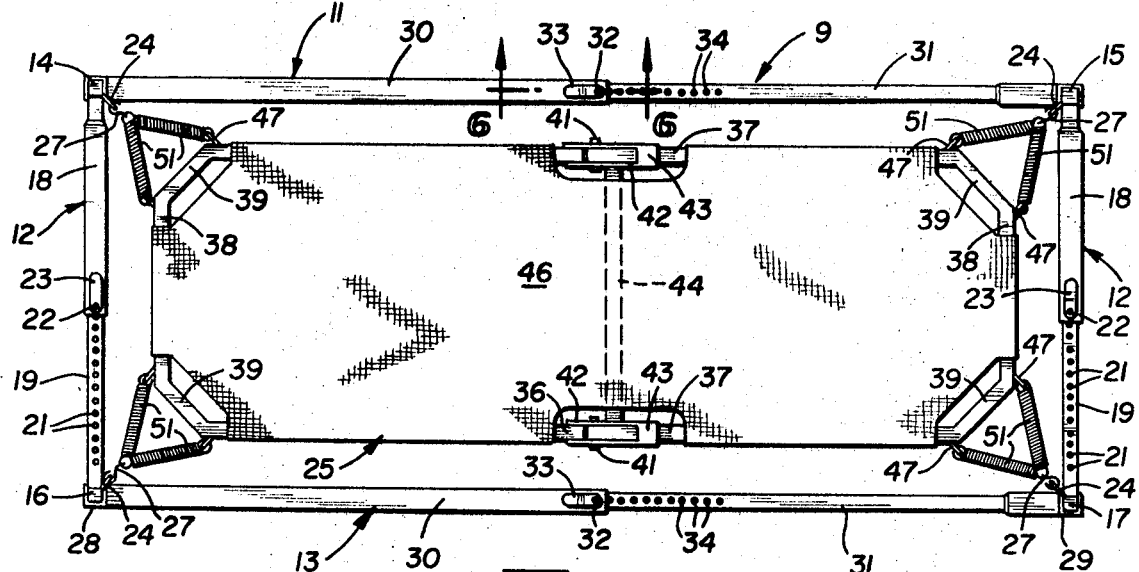
Fig_2
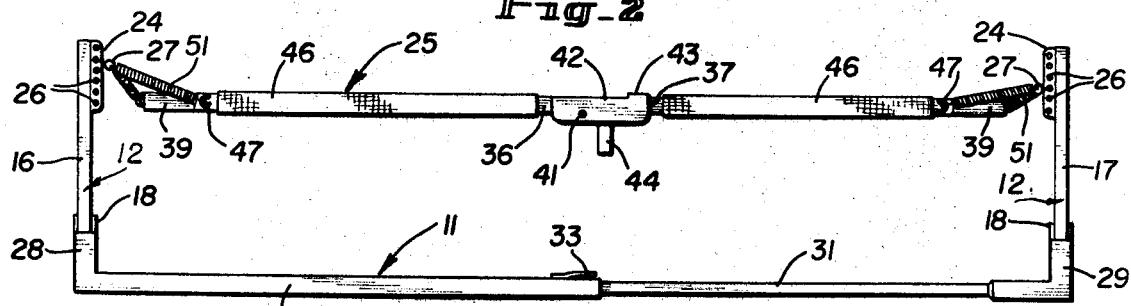
Fig_3
INVENTORS.
RICHARD J. CRAMER
ROBERT O. BEESON
BY: *Bryessinger*
ATTORNEY

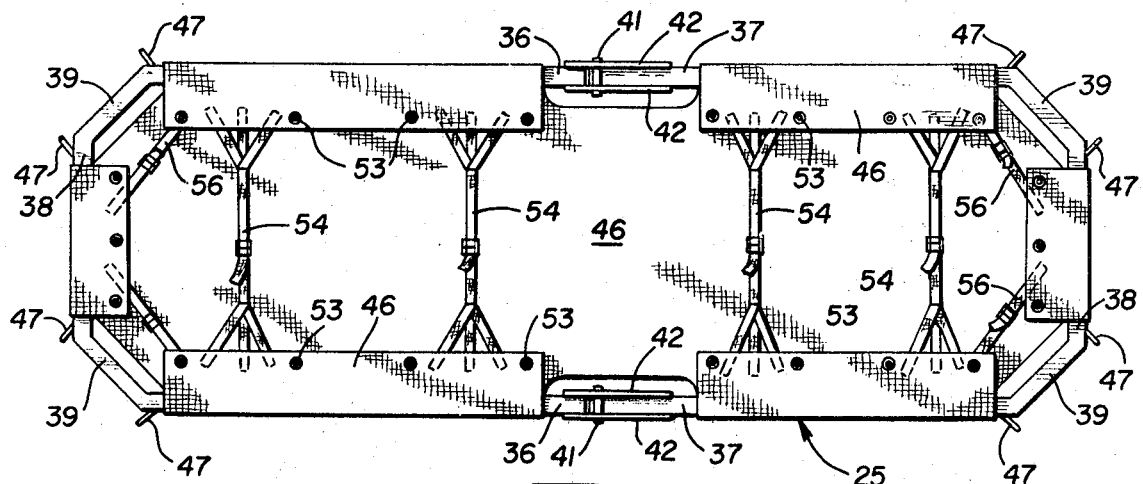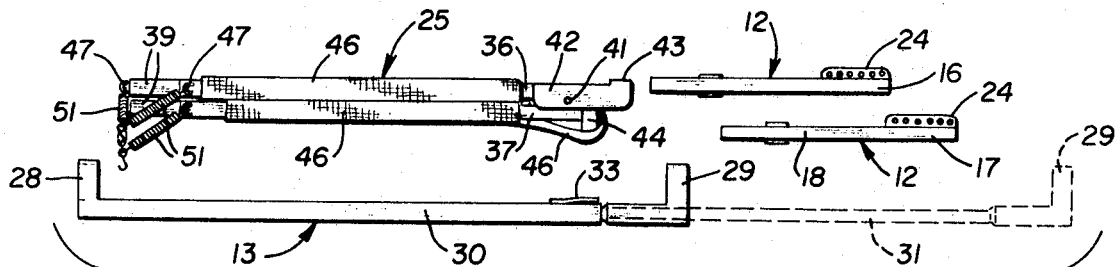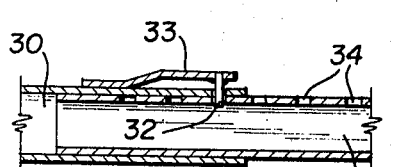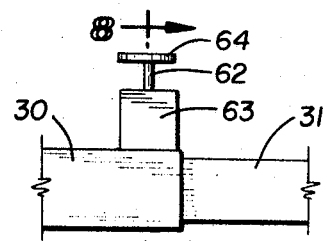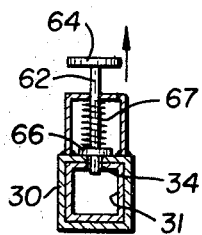

# United States Patent Office

3,524,673
Patented Aug. 18, 1970

3,524,673
BED FOR TRUCK CABS
Richard J. Cramer, Loveland, and Robert O. Beeson, Brighton, Colo., assignors, by direct and mesne assignments, to Western Sales and Supply Co., Denver, Colo., a corporation of Colorado
Filed Apr. 8, 1968, Ser. No. 719,637
Int. Cl. B60p 3/32
U.S. Cl. 296—23                                                        4 Claims

ABSTRACT OF THE DISCLOSURE

A bed assembly for use in the sleeper cabs of over-the-road trucks to provide improved comfort and security for driver users. The bed assembly has telescoping and foldable components to facilitate secure installation in a sleeper cab or selective removal therefrom. When removed and folded, the bed assembly may be transported in a driver's personal car until a next period of reuse in the same or a different sleeper cab. An extensible frame support may be locked in selected positions for engagement with truck cab elements to prevent shifting of the frame. A bed element is joined to the frame support by springs disposed in patterned arrangement to resist longitudinal and transverse as well as vertical movements of the bed.

BACKGROUND OF THE INVENTION

The bed assembly disclosed herein is intended for use in the sleeper cabs of long line trucks to provide additional comfort and safety for the drivers. In such trucks the constant jolting and movement within the sleeper cabs is a continuing problem for truck drivers. It is acknowledged that others have previously recognized the problem and have tried to provide bed constructions and assemblies that would minimize the problems occasioned by road shock and vehicle component vibrations. Though improved devices have been proposed, over-the-road units are on a predominant basis still ill equipped with only a solid floor and a pad mattress. Drivers who are on the road for long periods of time should have and would appreciate an improved sleeping accommodation. The present invention is intended to provide a bed assembly and system that can be easily installed or removed from a sleeper cab to provide increased comfort. The assembly incorporates many features which make it adaptable for useage in cabs of different size and configuration.

The invention further provides an assembly which can be owned or retained personally by individual drivers, since it may be moved from cab to cab as the driver's work assignment is changed. Such features distinguish the applicants' device from earlier developments in the field as generally defined by the prior art patents to Campbell, No. 3,067,437, and to Coup, No. 3,231,304.

While each of the mentioned patents is directed to a similar field of development and while the bed units therein disclosed would provide improvements over the presently used but substandard facilities, it is believed that the applicants' invention presents improvements that are more economical and more adaptable for widespread useage. Such improvements are embodied in simplicity of construction, ease of installation and removal, and in characteristics of construction contributing to personal user identification and ownership.

SUMMARY OF THE INVENTION

Briefly stated, the present invention provides a bed assembly inclusive of a frame support, a foldable bed, and bed and occupant suspension elements. The frame support utilizes extensible or telescoping members that may be disposed within a sleeper cab to be engaged with wall and deck structures to maintain secure positioning in such cab. Longitudinal and transverse head and side frame elements may be locked in position to support upright corner posts. The corner posts provide vertically adjustable receptacles for spring suspension elements that are positioned to oppose longitudinal, transverse and vertical movements of a bed disposed centrally within and between the corner posts. The springs are preferably of a tension type for engagement at offset positions on the bed. When in use, the springs will be under substantial tension and they will be disposed in horizontally oriented positions as opposed to vertical orientations. A preferred type bed element is foldable, and it has an exterior frame providing a rectangular bed support when in use. A stretchable cot type support element is disposed about opposed elements of the bed frame to support the user or a mattress pad. Cross braces may be provided on the bed structure. The bed in its extended use configuration is long enough to support a man, but it may be folded to less than full length to facilitate removal and carry functions.

BRIEF DESCRIPTION OF THE DRAWINGS

FIG. 1 is an end elevation of an installed assembly with elements of a truck-sleeper cab being shown in dotted outline, FIG. 2 is a top plan view of the preferred embodiment of FIG. 1, FIG. 3 is a side elevation of the preferred embodiment, FIG. 4 is a bottom view showing construction features of the bed frame component and of an applied cot canvas, FIG. 5 is a composite view of the elements of the total bed assembly in disassembled and folded relationship for purposes of removal and storage, FIG. 6 is a cross-section taken along the line 6—6 of FIG. 2 to show a first form of extension lock.

FIG. 7 is a partial side view of a modified form of lock, and

FIG. 8 is a cross-section taken along the line 8—8 of FIG. 7 showing additional features of such modified lock.

DESCRIPTION OF THE PREFERRED EMBODIMENTS

FIGS. 1 through 4 show elements of a bed assembly 9 made in accordance with a preferred embodiment of the present invention. The total bed assembly is intended for use in the sleeper compartment of a truck cab 10 to provide greater comfort for an off-duty driver. The bed assembly includes a frame support identified over all by the number 11. The frame support is made up of head pieces 12 and transverse or side rail elements 13. The head pieces 12 are of a substantial H-shaped configuration having corner posts 14 and 16, while the opposite head post has corner posts 15 and 17. Each of the head pieces 12 has a cross bar made up of an exterior receptacle 18 and a telescoping piece 19. The posts and cross bar are all preferably made of square or rectangular tubing whereby the fit between the telescoping elements 18 and 19 tends to hold the corner posts in aligned relationship. The piece 19 is provided with a plurality of punched holes 21 that may be selectively engaged by a lock pin 22 of the lock 23.

Each of the corner posts 14–17 is provided with an angularly disposed flange 24. This flange has a plurality of holes 26 drilled or punched therein to receive and support a hook 27 which is engaged to the bed and which determines the elevation for the bed 25. The head pieces 12 are actually received and supported in upright positions by the socket segments 28 and 29 at opposite ends of the transverse or side extension assemblies 13. The socket segments 28 are disposed at the ends of the side rail pieces 30, while the socket segments 29 are at the end of the telescoping rail piece 31.

As in the previous configuration, the telescoping rail 31 is provided with a plurality of holes 34 for the reception of the lock pin 32 of the lock 33. The lock 33 is similar in construction to the construction of the lock 23 as previously described and as more fully shown in FIGS. 6. As shown in this figure, the lock assemblies are each provided with a resilient carrier element 35 which supports the lock pins 32 and 22 and which is spot welded or otherwise attached to the exterior telescoping member.

When the bed unit 9 is being placed in a sleeper compartment, the transverse or side rails 13 will be placed in the cab and thereafter the H-shaped pieces 12 will be erected in the sockets 28–29. The side rails and head pieces are subsequently extended until the rails or head pieces are engaged with structural elements of the sleeper cab to securely hold the frame 11 in its erected position. Thereafter, insertion of the spring hooks 27 in the openings 26 of the flanges 24 will hold the bed components 25 in position above the sleeper cab floor. As shown in FIG. 3, the hooks 27 at one end of the bed may be placed at a higher elevation than the hooks at the opposite end of the bed. Where the holes are spaced apart approximately one inch, a two hole or two inch increased elevation at the end where the user's head will be will usually compensate for increased body weight at such end of the bed. Additional differential in the bed elevation may be used for individuals preferring an increased bed angle.

The elements of the bed 25 itself, as shown in the mentioned figures, include side legs 36 and 37 and ends 38. The side legs are joined to the ends by diagonal pieces 39. The side legs 36 and 37 are pivotally joined each to each by pins 41 which extend through the side braces 42 of a stop assembly 43 that is positioned to hold the side leg 36 and 37 in aligned positions when they are unfolded for use. A brace 44 can be provided to extend beneath a cot canvas 46 stretched on the bed elements 25 to prevent bending of the side legs 36 and 37 when a heavy load is applied to the stretched canvas 46. Eye flanges 47 are disposed at each of the corners defined by the diagonal pieces 39 to receive the inner or free ends of the springs 51. The flanges 47 are preferably spaced apart a substantial distance so that the springs 51 at any corner will be stretched in opposite directions at divergent angles approaching ninety degrees. With this arrangement the springs from adjacent corner posts extend in near opposite directions to hold the bed in a spring balanced position therebetween.

With longitudinally and transversely disposed springs at each corner post, longitudinal and transverse movements of the bed are substantially resisted. At the same time the springs are disposed at a slight angle away from the horizontal that will be increased by the weight of the occupant or as vertical road shocks are encountered. The multi-angle and opposed disposition of the springs illustrated operates effectively to absorb and minimize vehicle vibrations as well as road shocks so that the bed 25 is comfortably maintained. The opposed longitudinally positioned springs absorb longitudinal forces caused by vehicle accelerations and declerations, while the transversely disposed and opposed springs absorb and resist transversely directed vehicle turning or swaying forces.

FIG. 5 shows all of the elements of the bed assembly 9 in telescoped, folded and disengaged position. When disassembled in this manner, the bed may be easily transported and carried. It is intended that the entire assembly can be removed from sleeper cabs after the driver has completed a run to be reinstalled in the next tractor or truck to which the driver is assigned. The unit may be easily stored in the driver's automobile between periods of use. These foldable and disassembly features are made possible by construction features which are also operative when adjustment in the bed configuration is being made to fit the bed assembly to different sleeper cabs.

Features of a modified type of lock are shown in FIGS. 7 and 8. Here a lock pin 62 extends through a support housing 63 on the tube 30 and selectively into the lock openings 34 in the telescoping pieces 31. A knob 64 is provided on the lock pin 62, and a shoulder washer 66 is disposed within the housing 63. A spring 67 tends to urge the pin 62 toward the engaged position.

While a canvas 46 is shown as the actual user support element, it should be apparent that a woven wire type of element that was spring supported or other types of resilient fabric or resilient support elements could be used in substitution for the stretched canvas. Where canvas is to be used, a plurality of eyelets 53 can be provided to hold the canvas in place, or the adjustable cross straps 54 as shown in FIG. 4 may be used. If a cross brace 44 is used, the end straps 56 may need to be released or loosened when the bed is to be folded. This operation can be avoided by elimination of the cross brace, as shown in FIG. 4; by use of a more resilient support element 46, or by providing a movable stop 43 so that the bed can be folded in an opposite direction.

We claim:

1. A bed assembly for use within a sleeper cab of over the road trucks for the added comfort of a user sleeping in the cab and to isolate the user from longitudinal, transverse and vertical accelerations due to movements of the truck and from vibrations and road shocks comprising a support frame, head assemblies for said frame, side rail assemblies for said frame, extension means for at least one of said assemblies whereby said support frame may be extended or retracted to sizes corresponding to structural dimensions of said truck sleeper cab for secure positioning therein, posts provided by said support frame, a bed component for the support of a user occupant disposed between the posts of said support frame, side leg and end elements for said bed component providing support for said bed and user, paired resilient tension elements disposed at divergent angles away from each said post and separately connected to an end or side of said bed component for yieldably supporting said bed, said resilient elements being utilized in combination whereby longitudinal, transverse and vertical accelerations of said bed component are resisted by the resilient elements disposed at adjacent frame posts.

2. Structure as set forth in claim 1 wherein the angle of divergence for said resilient elements approximates ninety degrees.

3. Structure as set forth in claim 1 wherein said resilient elements are springs.

4. Structure as set forth in claim 3 wherein separate springs attached to adjacent posts extend in opposite directions one toward another for holding the bed in balanced position therebetween.

References Cited

UNITED STATES PATENTS

| | | | |
|---|---|---|---|
| 1,340,015 | 5/1920 | Clafin | 5—118 |
| 972,711 | 10/1910 | Palmer | 5—202 |
| 1,100,380 | 6/1914 | Kreuzkamp | 5—202 |

PHILIP GOODMAN, Primary Examiner

U.S. Cl. X.R.

5—118